United States Patent [19]
Rooney

[11] Patent Number: 5,912,387
[45] Date of Patent: Jun. 15, 1999

[54] AMINE HEAT STABLE SALT NEUTRALIZATION HAVING REDUCED SOLIDS

[75] Inventor: Peter C. Rooney, Lake Jackson, Tex.

[73] Assignee: The Dow Chemical Company, Midland, Mich.

[21] Appl. No.: 08/789,572

[22] Filed: Jan. 28, 1997

[51] Int. Cl.$^6$ ............... C07C 215/00; C07C 209/00; C07D 241/04
[52] U.S. Cl. ............ 564/463; 564/497; 544/358; 544/384
[58] Field of Search ............... 564/463, 497; 544/358, 384

[56] References Cited

FOREIGN PATENT DOCUMENTS

| | | | |
|---|---|---|---|
| 0286 143 A1 | 10/1988 | European Pat. Off. | ........ B01D 13/02 |
| 9221652 | 12/1992 | WIPO | ........... C07C 303/44 |

OTHER PUBLICATIONS

AN–010298, WPIDS, SU 1,426,072 (CAS Online Printout).

P. C. Rooney et al, *Effect of heat stable salts on MDEA solution corrosivity,* New Testing gives recommended limits of each species and the impact of temperature and pH, pp. 95–104, Hydrocarbon Processing, Mar. 1996.

P. C. Rooney et al, *Effect of heat stable salts on MDEA solution corrosivity of MDEA–Based Alkanolamine Plants, Part II,* Proceedings of the 1996 Laurance Reid Gas Conditioning Conference, Norman, OK, Mar. 4–6, 1996.

P. C. Rooney et al and K. D. Wilbanks, *Effect of Chloride on Solution Corrosivity of Methyldiethanolamine (MDEA) Solutions,* Paper No. 345, 1997 by NACE International Conference to be held Mar. 1997.

P. C. Rooney et al, *Effect of heat stable salts on MDEA solution corrosivity of MDEA–Based Alkanolamine Plants, Part III,* Proceedings of the 1997 Laurance Reid Gas Conditioning Conference to be held Mar. 1997..

*Primary Examiner*—José G. Dees
*Assistant Examiner*—Sabiha N. Qazi

[57] ABSTRACT

A process is disclosed for the neutralization of amine or alkanolamine heat stable salts with aqueous KOH or with alkali metal base, such as potassium hydroxide, sodium hydroxide, sodium carbonate, potassium carbonate, sodium bicarbonate or potassium bicarbonate formulated with amines or alkanolamines. The process results in less solid formation than commonly used alkali metal bases such as aqueous sodium hydroxide or aqueous potassium carbonate.

21 Claims, No Drawings

AMINE HEAT STABLE SALT NEUTRALIZATION HAVING REDUCED SOLIDS

BACKGROUND OF THE INVENTION

The present invention is to a process for neutralization of amine or alkanolamine heat stable salts formed when an amine solution is used in gas conditioning.

The formation of heat stable amine salts (HSAS) in amine solutions used in gas conditioning applications has long been a problem, particularly in refinery systems or when oxygen or carbon monoxide is present in the feed gas to the amine unit.

HSAS are called heat stable since they are not regenerable in the amine unit's stripping section, as are hydrogen sulfide ($H_2S$) and carbonate/bicarbonate/carbamate ($CO_2$) salts. These HSAS, such as amine salts of formate, acetate, glycolate, glyoxalate, oxalate, thiocyanate, thiosulfate, sulfate, sulfite and chloride, decrease the acid gas carrying capacity of the amine and increase solution viscosity, thus increasing amine unit operating costs.

Several methods are reported to reduce HSAS in amine solutions, though the costs are very expensive and each method has practical limitations. Anion exchange is a method of removing HSAS to low levels (i.e. below 500 ppm). If cations such as iron and sodium need to be removed, then a cation anion exchange resin is also required. One disadvantage of ion exchange is the high amount of water wash required to regenerate the resin beds. In addition, ion exchange resins do not generally remove organic impurities such as hydrocarbons and triethylene glycol commonly found in amine solutions. Distillation and vacuum distillation can remove organic impurities such as triethylene glycol and hydrocarbons but the process is energy intensive since the amine and water both are carried overhead in the purification process. If HSAS are present, the amine solution must also be neutralized with strong base to prevent acids, especially formic acid and acetic acid, from going overhead into the purified amine solution.

To extend the time before having to reclaim or discard an amine solution, aqueous sodium hydroxide (caustic) or aqueous potassium carbonate are extensively used in the gas treating industry to neutralize HSAS. These bases, being stronger bases than amines generally used in gas treating operations, react with the amine HSAS to displace the amine and form the corresponding sodium or potassium salt, such as sodium or potassium salts of acetate, formate, oxalate etc. This displacement also regenerates free amine to be used for acid gas pick-up. Rooney et. al. in Hydrocarbon Processing, March 1996, pages 95 et seq. disclose the addition of chloride-free caustic (25 Baume or 19 weight percent NaOH) for neutralizing HSAS. Generally, sufficient sodium hydroxide is added to free about 80% of the amine HSAS. Limiting the freed amine to about 80% of the original HSAS is reported to provide safeguards against excess addition of sodium hydroxide, which can result in localized corrosion problems.

Although neutralization of HSAS with sodium hydroxide does extend the time before the amine solution must be reclaimed or discarded, such neutralization still results in the formation of a number of solids in the amine solution. These solids are detrimental to the operation of the amine solution and lead to amine solution losses, increased maintenance activities and occasionally plant shutdowns. It would therefore be advantageous to have a process for neutralization of amine solutions containing HSAS whereby the amount of solids formed in the amine solution is reduced and/or the useful life of the amine solution is increased.

SUMMARY OF THE INVENTION

The present invention is to a process for the neutralization of an amine solution containing a heat stable amine salt comprising contacting the amine solution containing an amine heat stable salt with potassium hydroxide or an alkali metal base formulated with an amine. The process of the present invention results in less solid formation than occurs when using an alkali metal base such as aqueous sodium hydroxide or aqueous potassium carbonate as is currently commonly used. Reduced solids in the amine solutions result in less filter plugging problems, less foaming, less corrosion problems due to erosion and/or corrosion caused by the solids, and extends the time for use of the amine gas treating solution before needing to dispose of or reclaim the amine.

DETAILED DESCRIPTION OF THE INVENTION

In the process of this invention, a neutralizing solution of potassium hydroxide or an alkali metal base formulated with an amine is contacted with an amine solution containing a heat stable amine salt to neutralize the HSAS. As used herein, the term amine as it refers to an amine solution, includes cyclic and acyclic alkyl amines and alkanolamines.

In the process of the present invention, it was unexpectedly found that the addition of potassium hydroxide to an amine solution containing a HSAS, to neutralize the HSAS, greatly reduces the amount of formed solids. It was also unexpectedly found that there is a reduction in the amount of solids formed when an alkali metal base formulated with an amine is used to neutralize HSAS contained in an amine solution.

The process of the present invention is applicable in the use of all commonly known and used amines useful for gas conditioning. Examples of commonly used amines include, methyldiethanolamine (MDEA), monoethanolamine (MEA), diethanolamine (DEA), diisopropanolamine (DIPA), 2-amino-2-methyl-1-propanol (AMP), monoisopropanolamine (MIPA), methylmonoethanolamine (MMEA), ethylmonoethanolamine (EMEA), butylmonoethanolamine (BMEA) triethanolamine (TEA), diglycolamine (DGA), 4-(2-hydroxyethyl)piperazinone (4-HEP), piperazine, or mixtures thereof. Preferably the amine is MDEA, MEA, DEA, TEA, DGA or a mixture thereof. More preferably the amine is MDEA, MEA, DEA or a mixture thereof.

The process for gas conditioning is well known in the art, see for example, Kohl & Riesenfeld "Gas Purification" third edition, McGraw-Hill, New York, 1960 the disclosure of which is incorporated herein by reference. Generally the gas is contacted with an amine solution in a continuous counter-current flow process. The gas is generally fed into the bottom of an absorber unit where the gas is contacted counter-currently with a lean amine composition to remove the desired acid gas component or components, such as $CO_2$, COS, $CS_2$, $H_2S$ and HCN, to produce a rich amine solution. For regeneration of the amine solution, the rich amine solution is sent to a stripping tower whereby the acid gases are removed. When a thermal or vacuum reclaimer is used, a slip stream of the lean amine is generally sent to a reclaimer where the amine solution is heated and the purified amine distilled off. The addition of KOH, or a formulation of an amine with an alkali metal base is generally made in the present invention to the slip stream prior to going to the reclaimer or can be added to the lean stream prior to being recirculated into the absorber unit. In a preferred embodiment, a portion of the HSAS present in the amine solution is neutralized prior to entry into the reclaimer and partially neutralized prior to recirculation to the absorber unit.

The concentration of KOH used in the present process will generally depend upon the specific operating conditions of an individual gas conditioning facility. Generally the potassium hydroxide concentration is about 5 to about 60 weight percent. Preferably the potassium hydroxide concentration is about 25 to about 50 weight percent. More preferably the potassium hydroxide concentration is about 35 to about 50 weight percent. For convenience, commercially available solutions containing about 40–45 weight percent potassium hydroxide is used. Lower concentrations can be used, however; for facilities that cannot handle the extra water that enters the plant, some of the circulating amine solution may have to be removed to allow for the extra KOH solution required.

For making formulations of an amine and an alkali metal base, a water solution containing about 40–45 weight percent alkali metal base, which are commercially available, can be used. Examples of preferred alkali metal bases include potassium hydroxide, sodium hydroxide, sodium carbonate, potassium carbonate, sodium bicarbonate, potassium bicarbonate and mixtures thereof. Preferably the alkali metal base is potassium hydroxide, potassium carbonate, potassium bicarbonate or a mixture thereof. More preferably the alkali metal base is potassium hydroxide. Such alkali metal bases generally have a low freeze point that is compatible with the amine/water solutions generally used in the gas treating industry.

The amount of amine in the alkali metal base solution should be enough such that the solubility of the solids in the plant operating solution is increased compared to alkali metal base and water alone. The amount of reduction in solids formed will be dependent upon the specific gas conditioning plant's operating conditions. Care should be taken, for example, not to add so much amine that alkali metal base precipitates from the amine, or that the freezing point of the solution becomes too high to transport safely. Preferably, the amine concentration should be about 0.1 to 50 weight percent, more preferable about 5 to about 40 weight percent and most preferably about 5 to about 20 weight percent. Testing for the optimum concentration of amine can be performed for the specific plant solution to be treated.

The addition of the neutralizing solution of aqueous KOH or alkali metal base with amine can be added when the HSAS amine solution is in any tank, such as a storage tank, by adding the neutralizing solution with mixing. However, it is often convenient that the neutralizing solution be added to the plant solution when the amine is being recycled for treating gas streams. When added during plant operations, addition of the neutralizing solution is best performed at a point where the level of acid gases, such as carbon dioxide and hydrogen sulfide, in the amine treating solution is low to prevent reaction of the potassium hydroxide with the acid gases instead of with the HSAS. Generally, a preferred place of adding the neutralizing solution during plant operations is on the suction side of the lean amine pump, just before the absorber. Although any means commonly used in the art for addition of the neutralizing solution is adequate, a preferred means is addition though an injection quill. Generally, the addition should be continuous with thorough mixing. The concentration of components in the neutralizing solution is generally chosen such that the neutralizing solution can be added at a feed rate of 0.1 percent of the amine recirculation rate. The amount of neutralizing solution added should be based upon calculations to free about half of the amine from the HSAS. After confirming proper addition for neutralizing about 50 percent of the HSAS, additional neutralizing solution can be added to free about 80 to 100 percent of the total amine present as HSAS, more preferably about 75 to 80 percent of the amine present in the HSAS. Limiting the freed amine to about 75 to about 80 percent of the original HSAS provides safeguards against excess addition of caustic, which can result in localized corrosion problems.

When adding a neutralizing solution of an amine formulated with an alkali metal base, for ease of plant operations, it is preferred that the amine present in the neutralizing solution is the same as the amine currently used in a plant for gas conditioning. By way of example, for plant operations using a solution of MEA for gas conditioning, if using a neutralizing solution of an amine with an alkali metal base, it is preferred that the amine with an alkali metal base is MEA. However, the process of the present invention is well suited as a means by which the amine solution used for gas conditioning can be changed.

The invention will be further clarified by a consideration of the following examples, which are intended to be purely exemplary of the present invention. All weights are percent by weight unless otherwise indicated.

EXAMPLE 1

100 g of an operating plant amine solution containing approximately 60 percent MDEA, 40,000 ppm acetate, 10,000 ppm formate, 4000 ppm oxalate and 6400 ppm thiosulfate was fully neutralized with various bases at room temperature in a 250 mL erlenmeyer flask. Each solution was stirred using a magnetic stir bar for about 20 minutes after addition of the base. The solids formed were filtered with Whatman No. 42 filter paper and weighed. The results in Table 1 show that KOH, or an alkali metal base formulated with an amine reduce the amount of solids formed and recovered as compared to the use of sodium hydroxide. The results are particularly dramatic for the use of KOH or KOH formulated with an amine (examples 1 and 2 respectively).

TABLE 1

| Example No. | Base used | grams used | grams solids |
|---|---|---|---|
| 1 | 45% KOH/water | 13.89 | 2.15 |
| 2 | 39% KOH, 11.3% MDEA, water | 16.0 | 1.39 |
| 3 | 50% NaOH/water | 8.9 | 7.86 |
| 4 | 39% NaOH, 11% MDEA, water | 11.4 | 7.30 |
| 5 | 37% K2CO3 | 41.6 | 12.9 |
| 6 | 37% K2CO3, 11.3% MDEA, water | 41.6 | 12.5 |

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A process for neutralizing an amine solution containing a heat stable amine salts comprising contacting the amine solution containing a heat stable amine salt with an aqueous solution of potassium hydroxide or an alkali metal base formulated with an amine.

2. The process of claim 1 wherein the amine solution containing a heat stable amine is contacted with potassium hydroxide.

3. The process of claim 2 wherein the potassium hydroxide concentration is about 5 to about 60 weight percent.

4. The process of claim 3 wherein the potassium hydroxide concentration is about 25 to about 50 weight percent.

5. The process of claim 4 wherein the potassium hydroxide concentration is about 35 to about 50 weight percent.

6. The process of claim 1 wherein the amine solution containing a heat stable amine salt is contacted with an alkali metal base formulated with an amine.

7. The process of claim 6 wherein the alkali metal base is sodium hydroxide, potassium hydroxide, potassium carbonate, sodium carbonate, sodium bicarbonate, potassium bicarbonate, or a mixture thereof.

8. The process claim 1 wherein the amine is methyldiethanolamine, monoethanolamine, diethanolamine, diisopropanolamine, 2-amino-2-methyl-1-propanol, monoisopropanolamine, methylmonoethanolamine, ethylmonoethanolamine, butylmonoethanolamine, triethanolamine, diglycolamine, 4-(2-hydroxyethyl)piperazinone, piperazine or a mixture thereof.

9. The process of claim 8 wherein the amine is methyldiethanolamine, monoethanolamine, diethanolamine or a mixture thereof.

10. The process of claim 9 wherein the amine is monoethanolamine.

11. The process of claim 10 wherein the amine concentration is about 0.1 to about 50 weight percent.

12. The process of claim 11 wherein the amine concentration is about 5 to about 40 weight percent.

13. The process according to claim 12 wherein the amine concentration is about 5 to about 20 weight percent.

14. The process of claim 6 wherein at least one amine in the amine solution containing a heat stable amine salt and the amine in the alkali metal base and amine formulation are the same.

15. The process of claim 14 wherein the amine is methyldiethanolamine, monoethanolamine, diethanolamine, diisopropanolamine, 2-amino-2-methyl-1-propanol, monoisopropanolamine, methylmonoethanolamine, ethylmonoethanolamine, butylmonoethanolamine, triethanolamine, diglycolamine, 4-(2-hydroxyethyl)piperazinone, or piperazine.

16. The process of claim 15 wherein the amine is monoethanolamine.

17. The process of claim 7 wherein the alkali metal base is potassium hydroxide.

18. The process of claim 7 wherein the amine is methyldiethanolamine, monoethanolamine, diethanolamine, diisopropanolamine, 2-amino-2-methyl-1-propanol, monoisopropanolamine, methylmonoethanolamine, ethylmonoethanolamine, butylmonoethanolamine, triethanolamine, diglycolamine, 4-(2-hydroxyethyl)piperazinone, piperazine or a mixture thereof.

19. The process of claim 18 wherein the amine is methyldiethanolamine, monoethanolamine, diethanolamine or a mixture thereof.

20. The process of claim 19 wherein the amine is monoethanolamine.

21. The process of claim 1 wherein the potassium hydroxide or alkali metal base formulated with an amine is added to a plant solution of amine containing heat stable amine salts by means of an injection quill at the suction side of a pump transferring a lean amine solution containing heat stable amine salts.

* * * * *